United States Patent
Kast

(10) Patent No.: US 11,453,279 B2
(45) Date of Patent: Sep. 27, 2022

(54) SEALING STRAND, IN PARTICULAR FOR PROCESSING AS AN ENDLESS STRAND

(71) Applicant: CQLT SAARGUMMI TECHNOLOGIES S.À.R.L., Remich (LU)

(72) Inventor: Christian Kast, Merzig (DE)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 354 days.

(21) Appl. No.: 16/651,491

(22) PCT Filed: Sep. 21, 2018

(86) PCT No.: PCT/EP2018/000441
§ 371 (c)(1),
(2) Date: Mar. 27, 2020

(87) PCT Pub. No.: WO2019/072406
PCT Pub. Date: Apr. 18, 2019

(65) Prior Publication Data
US 2020/0262282 A1 Aug. 20, 2020

(30) Foreign Application Priority Data

Oct. 9, 2017 (DE) ..................... 10 2017 123 419.5

(51) Int. Cl.
*E06B 7/22* (2006.01)
*B60J 10/23* (2016.01)
(Continued)

(52) U.S. Cl.
CPC .......... *B60J 10/2335* (2016.02); *B60J 10/35* (2016.02); *B60J 10/80* (2016.02); *F16J 15/027* (2013.01)

(58) Field of Classification Search
CPC ........ B60J 10/2335; B60J 10/35; B60J 10/80; F16J 15/027; F16J 15/061
(Continued)

(56) References Cited

U.S. PATENT DOCUMENTS 4,617,220 A * 10/1986 Ginster ................. E06B 7/2309
428/3
6,012,760 A 1/2000 Nozaki
(Continued)

FOREIGN PATENT DOCUMENTS

DE 102005036200 A1 3/2006
DE 102017123419 A1 * 4/2019 .......... B60J 10/2335
(Continued)

*Primary Examiner* — Jerry E Redman
(74) *Attorney, Agent, or Firm* — Lucas & Mercanti, LLP; Klaus P. Stoffel

(57) ABSTRACT

A sealing strand, in particular for processing during continuous feeding and separation of use portions, including multiple strand parts each of which are connected to one other at abutting ends, and including a double-sided adhesive tape. A removable protective strip covers the tape adhesive surface facing away from the remaining sealing strand. The protective strip has a butt strap at each of the butt joints. The butt strap overlaps the abutting ends of the protective strip portions of the strand parts. Each connection between the butt strap and the overlapping abutting ends of the protective strip portions of the strand parts begins only at a distance from the butt joint. The connection of the butt strap to at least one of the two overlapped abutting ends begins in a region in the strand longitudinal direction of consecutive separating cuts in the abutting end.

10 Claims, 3 Drawing Sheets

(51) Int. Cl.
*B60J 10/35* (2016.01)
*B60J 10/80* (2016.01)
*F16J 15/02* (2006.01)

(58) Field of Classification Search
USPC .................................................. 49/498.1
See application file for complete search history.

(56) References Cited

U.S. PATENT DOCUMENTS

| | | | |
|---|---|---|---|
| 6,485,030 B1 | 11/2002 | Hahn | |
| 6,820,372 B2* | 11/2004 | Nozaki | B60J 10/24 |
| | | | 49/492.1 |
| 9,676,261 B2* | 6/2017 | Krueger | E06B 7/24 |
| 2001/0005960 A1* | 7/2001 | Yamaguchi | B60J 10/35 |
| | | | 49/489.1 |
| 2001/0054261 A1* | 12/2001 | Nozaki | B60J 10/248 |
| | | | 49/498.1 |
| 2004/0144036 A1* | 7/2004 | Heyden | B60J 10/35 |
| | | | 49/498.1 |
| 2004/0255520 A1* | 12/2004 | Baratin | B60J 10/16 |
| | | | 49/498.1 |
| 2004/0261322 A1* | 12/2004 | Baratin | B60J 10/24 |
| | | | 49/498.1 |

FOREIGN PATENT DOCUMENTS

| | | | | |
|---|---|---|---|---|
| EP | 1095808 A2 | 5/2001 | | |
| FR | 2711749 A1 | 5/1995 | | |
| GB | 2036840 A * | 7/1980 | ............ | B60J 10/16 |
| WO | 9926801 A1 | 6/1999 | | |
| WO | WO-0249866 A1 * | 6/2002 | ............ | B60J 10/15 |

\* cited by examiner

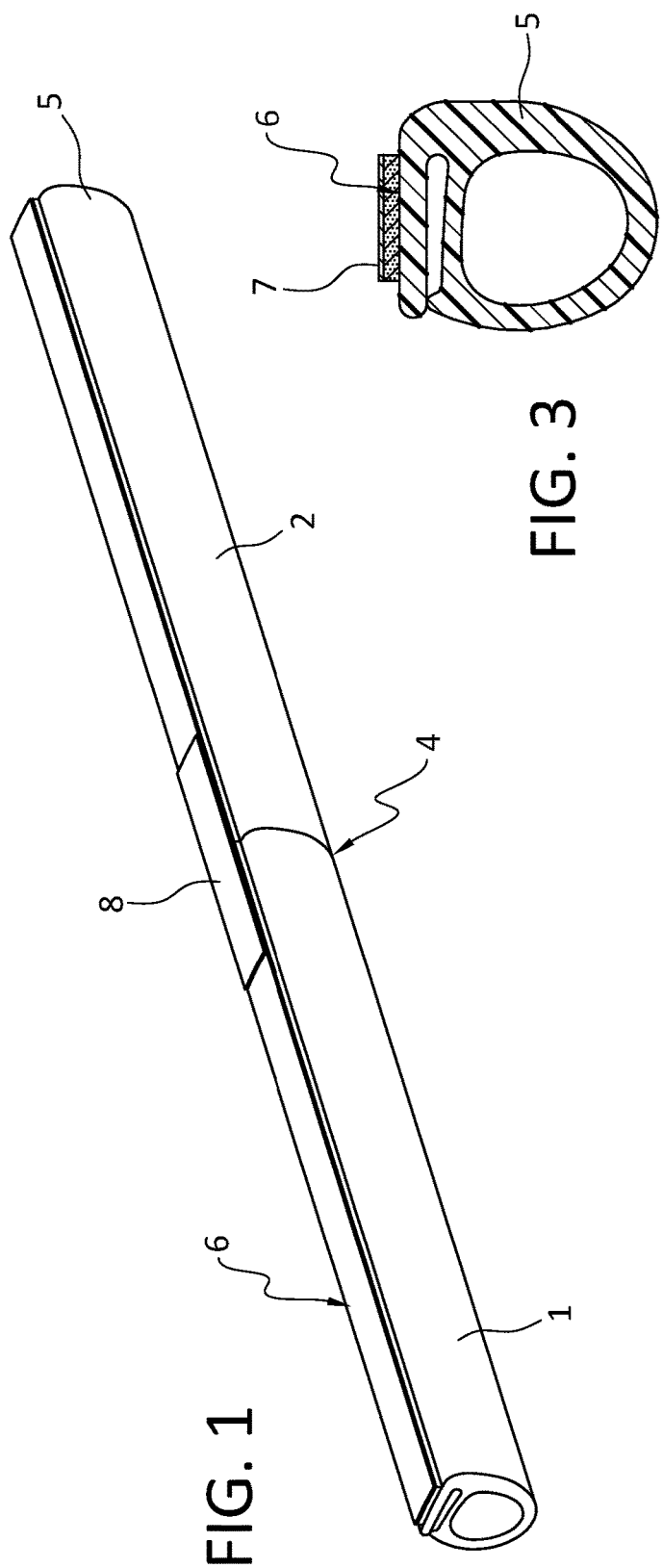
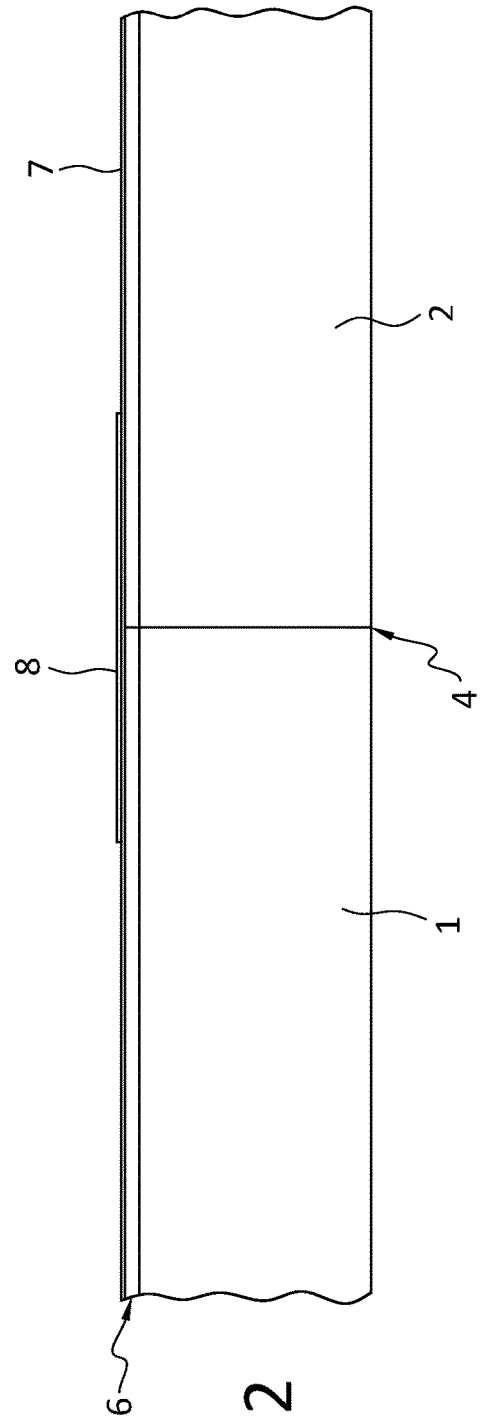

SEALING STRAND, IN PARTICULAR FOR PROCESSING AS AN ENDLESS STRAND

The present application is a 371 of International application PCT/EP2018/000441, filed Sep. 21, 2018, which claims priority of DE 10 2017 123 419.5, filed Oct. 9, 2017, the priority of these applications is hereby claimed and these applications are incorporated herein by reference.

BACKGROUND OF THE INVENTION

The invention relates to a sealing strand, in particular for processing with continuous infeed and separation of useful portions, having a plurality of strand parts, which are connected to one another at abutting ends, and having a double-sided adhesive tape, that adhesive surface of said tape which faces away from the sealing strand being covered by a removable protective strip, wherein the protective strip, at the butt joints, has a respective connecting tab which overlaps the abutting ends of the protective strip portions of the strand parts, and wherein a connection between the connecting tab and the protective strip portions in each case starts only at a distance from the butt joint.

In the course of the processing as an endless strand, the protective strip has to be removed from the adhesive tape, the connecting tabs ensuring that the removal operation is not interrupted at the butt joints. For the removal operation, a removal force is exerted on the protective strip in a manner inclined with respect to the strand longitudinal direction, said force increasing to an undesirably large extent at the joints, which hinders the processing of the continuously fed-in sealing strand. To avoid such an increase in the required removal force, the connecting tab is not connected, for example by way of adhesive bonding or welding, over its entire length to the ends of the protective strip. In a narrowly spaced area around the butt joint, a connection-free portion remains which is for example produced by partially covering the protective strip prior to the connection to the connecting tab. At the points where the connection between the connecting tab and the protective strip in each case starts at a distance from the butt joint, the protective strip must be provided with a separating cut prior to the connection to the connecting tab. If, in the context of manufacturing tolerances, the separating cut is not positioned close enough to the point where the connection of the protective strip to the tab starts, it may be necessary to also remove the non-connected part of the protective strip up to the butt joint. The force required therefor is undesirably high, in particular so high that the protective strip, including the connecting tab, could tear.

SUMMARY OF THE INVENTION

The invention is based on the object of providing a new sealing strand of the kind mentioned above, which facilitates a more reliable removal of the protective strip having connecting tabs from the sealing strand.

The sealing strand according to the invention which achieves said object is characterized in that the connection of the connecting tab to at least one of the two overlapped abutting ends in a region of separating cuts, which follow one after another in the strand longitudinal direction, in the abutting end of the protective strip portion.

A series of separating cuts which closely follow one another advantageously achieves a situation whereby, in a wide region, independently of the position at which the connection between the connecting tab and the protective strip portion starts, the protective strip can be removed without a large amount of effort in that at most a non-connected protective strip portion of the length of the distance between two separating cuts impedes the removal and has to also be removed.

Regions of successive separating cuts on both sides of the butt joint have the advantage that undesired increases in the required removal force can be avoided in both of the possible removal directions.

The separating cuts are preferably configured to be continuous over the entire width and/or thickness of the protective strip.

The successive separating cuts may extend in a perpendicular or/and inclined manner with respect to the strand longitudinal direction.

In particular, the separating cuts may extend in a manner that is different than a straight line and may, for example, extend in a converging pointed manner or in a convex arc, counter to the removal direction.

In one embodiment of the invention, the region of separating cuts, which follow one after another in the strand longitudinal direction, may reach as far as the relevant abutting end of the respective protective strip.

The distance between the separating cuts is preferably less than 2 mm, in particular less than 1.5 mm.

In a further preferred embodiment, the width of the separating cuts is <0.5 mm.

The connecting tab may be welded or/and adhesively bonded to the protective strip or protective strip portion.

The welding is expediently performed under the action of pressure and heat.

BRIEF DESCRIPTION OF THE DRAWING

The invention is explained in greater detail below on the basis of exemplary embodiments and the attached drawings, which relate to said exemplary embodiments and in which:

FIG. 1 shows a perspective view of a sealing strand according to the invention,

FIG. 2 shows a longitudinal side view of a portion of the sealing strand of FIG. 1, FIG. 3 shows the sealing strand of FIG. 1 in cross section.

DETAILED DESCRIPTION OF THE INVENTION

Figure 4:
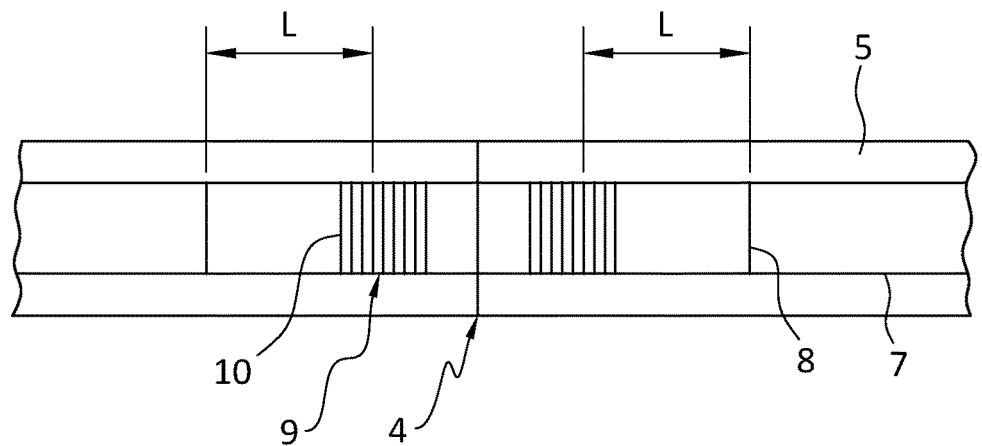
FIG. 4 shows a butt joint of the sealing strand of FIG. 1 in a plan view of an adhesive tape.

A sealing strand, of which FIG. 1 shows a detail, has strand parts. The parts 1 and 2 thereof are visible in FIG. 1. The strand parts which form the sealing strand are, at their end sides, joined to each other in each case to form butt joints 4.

The sealing strand is composed of an extruded elastomer body 5 and a double-sided adhesive tape 6, which is adhesively bonded to the elastomer body 5, the extruded elastomer body 5 and the adhesive tape 6 in each case being interrupted at the butt joints 4. The adhesive surface, which faces away from the elastomer body 5, of the adhesive tape 6 is covered by a protective strip 7, referred to as a liner in the field. At the butt joints 4, a respective connecting tab 8 connects the ends of the liner portions of the strand parts which abut against each other.

The sealing strand described above is prepared for processing as an endless strand, in the case of which the sealing strand is for example unwound from a supply roll (not shown) and fed to application equipment, which continuously separates useful portions from the strand and produces seals, for example for vehicle doors, directly therefrom.

The butt joints 4 are produced as a result of the fact that, during the production of the sealing strand, defective portions are removed from the extruded strand which is connected to the adhesive tape 6. During the processing at the vehicle manufacturer, only portions of the sealing strand that contain butt joints 4 then need to be discarded as defective.

In the course of the processing as an endless strand, the liner 7 is removed from the sealing strand, the connecting tabs 8 ensuring that the removal operation is not interrupted at the butt joints 4.

As is shown by way of example in FIG. 4, the connecting tabs 8 at the butt joints 4 are not connected continuously over their entire length to the liner portions, which abut against each other, of the liner 7, it rather being the case that connecting regions L start, in the strand longitudinal direction, in each case only at a distance from the butt joint 4 within a region 9 in which the liner 7 has separating cuts 10, which follow one after another in the strand longitudinal direction. In the exemplary embodiment shown, the separating cuts 10 extend perpendicularly to the strand longitudinal direction and completely sever the liner 7 in each case over the entire thickness and width. The distance between the separating cuts 10 is 1.5 mm, and the separating-cut width is 0.4 mm. The separating cuts 10 are preferably formed by means of a laser cutting unit, which facilitates precise guidance of the cutting, which is matched to the thickness of the liner, without exerting any cutting pressure.

The connection in the regions L can be produced by way of welding or/and adhesive bonding. The welding is performed in particular under the action of heat and pressure. The lack of connection of the connecting tab 8 to the liner 7, in a portion 14 between the connecting regions L, may for example be caused by the fact that a cover is placed on in the portion 14 prior to the connection of the liner 7 to the connecting tab 8, and the cover is removed again by being laterally slid out. In the case of adhesive bonding of the connecting tab 8 to the liner ends at the butt joint, adhesive layers produced on the connecting tab 8 can be restricted to the regions L. Depending on the preciseness of the positioning of the connecting tab 8 in relation to the butt joint 4, or on the preciseness of the positioning of the connecting regions L on the connecting tab 8, the distance from the butt joint 4, at which distance the connection between the connecting tab and the liner starts, may be subject to fluctuations.

Figure 5:
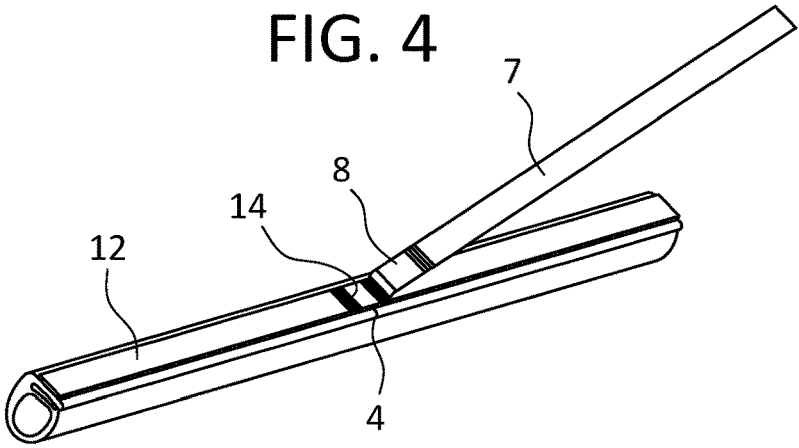
FIG. 5 shows an illustration which elucidates the removal of the protective strip from the adhesive tape of the sealing strand of FIG. 1, in a perspective view.
Figure 6:
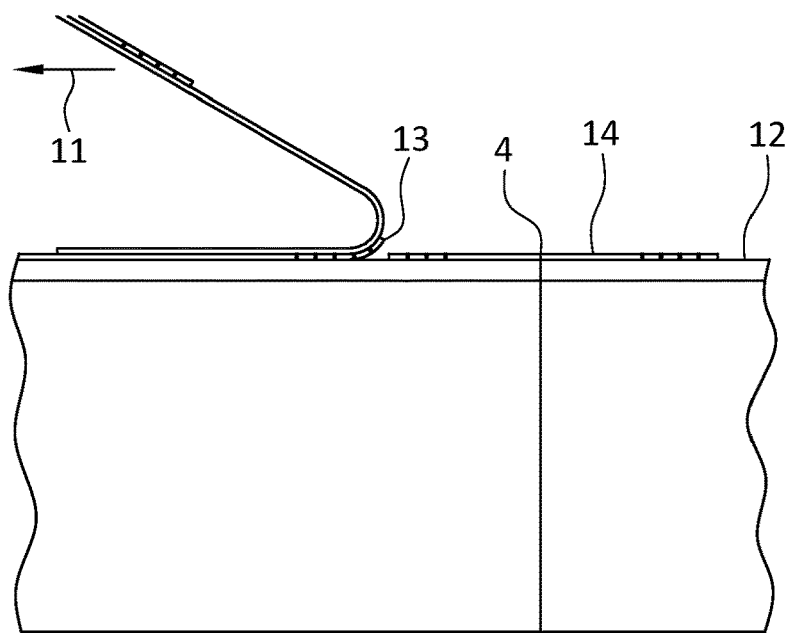
FIG. 6 shows an illustration which elucidates the removal of the protective strip, in a side view of the sealing strand of FIG. 1.

In the case of the aforementioned removal, illustrated in FIGS. 5 and 6, of the liner 7 from the adhesive tape 6, in the course of the processing of the sealing strand, a removal force is exerted in the liner longitudinal direction 11, the liner 7 peeling in the direction of the arrow 11 away from that adhesive surface 12 of the adhesive tape 6 which faces away from the elastomer body 5.

According to FIGS. 5 and 6, that part 14 of the liner 7 which has separating cuts 10, which is interrupted at the butt joint 4 and which was not connected to the connecting tab 8 remains behind when the liner 7 is removed from the adhesive surface 12.

As can be seen in particular in FIG. 6, the liner 7 lifts off from the adhesive surface 12 again only if, at 13, one of the connecting regions L between the connecting tab 8 and the liner 7 starts anew.

Since the latter end position 13 of the region L may be subject to fluctuations depending on how precisely the aforementioned cover for the liner part 14, which is not to be connected, has been positioned, or on how precisely the connecting tab 8 has been positioned, in relation to the butt joint 4, the compact series of separating cuts 10 ensures a multiplicity of removal possibilities, independently of the position at which the connecting region L starts within the region 9. It is necessary to also remove at most a non-connected portion of the liner 7 between only two separating cuts 10. The liner 7 can thus be removed with reduced effort and in a reliable manner without the risk of tearing the liner and the connecting tab, said risk being present if a single separating cut were to be formed, in the removal direction, prior to the beginning of the connecting region L. In the latter case, the liner located in the non-connected portion 14 would also have to be removed in the opposite direction, which could necessitate a removal force that exceeds the strength of the liner.

Figure 7:
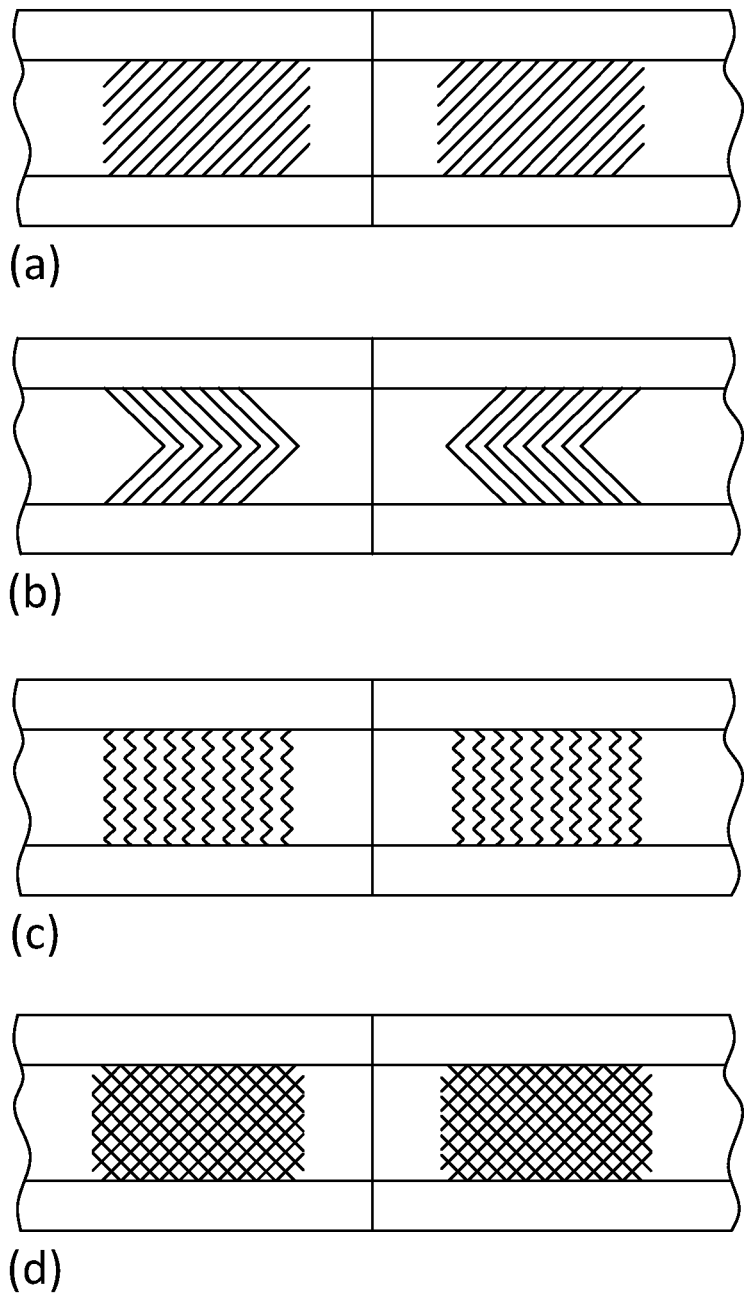
FIG. 7 shows exemplary embodiments for different separating-cut regions, which are formed on a protective strip portion.

FIG. 7 shows further exemplary embodiments for the formation of separating-cut regions of separating cuts which closely follow one another in the strand longitudinal direction. Separating-cut regions illustrated in FIG. 7a have separating cuts which extend in an inclined manner with respect to the liner longitudinal direction. FIG. 7b shows separating cuts which demonstrate separating cuts that converge in the direction of the butt joint. FIG. 7c shows undulating separating cuts which, in the center, extend perpendicularly to the liner longitudinal direction. According to FIG. 7d, separating cuts which extend in an inclined manner with respect to the liner longitudinal direction are provided, said separating cuts intersecting and forming a rhomboid pattern.

The invention claimed is:

1. A sealing strand, comprising: a plurality of strand parts that which are in each case connected to one another at abutting ends; a double-sided adhesive tape provided on each of the strand parts and having an adhesive surface that faces away from the sealing strand; and a removable protective strip on the adhesive surface, wherein the protective strip, at butt joints of the abutting ends of the strand parts, has a respective connecting tab that overlaps abutting ends of the protective strip of the strand parts, and wherein a connection between the connecting tab and the overlapped abutting ends of the protective strip portions of the strand parts in each case starts only at a distance from the butt joint, wherein the connection of the connecting tab to at least one of the two overlapped abutting ends starts in a region of successive separating cuts, which follow one after another in a strand longitudinal direction, in the abutting end of the protective strip portion.

2. The sealing strand according to claim 1, wherein the successive separating cuts extend in a perpendicular or inclined manner with respect to a strand longitudinal direction.

3. The sealing strand according to claim 1, wherein the separating cuts are continuous over a width and/or thickness of the protective strip.

4. The sealing strand according to claim 1, wherein the separating cuts extend in a manner that is different than a straight line.

5. The sealing strand according to claim 4, wherein the separating cuts extend in a pointed manner or in a convex arc, counter to a removal direction.

6. The sealing strand according to claim 1, wherein the region of successive separating cuts reaches as far as the butt joint.

7. The sealing strand according to claim 1, wherein a distance between the separating cuts is <2 mm.

8. The sealing strand according to claim 1, wherein a width of the separating cuts is <0.5 mm.

9. The sealing strand according to claim 1, wherein the connecting tab is welded or/and adhesively bonded to the protective strip.

10. The sealing strand according to claim 9, wherein the connecting tab is welded to the protective strip by pressure and heat.

* * * * *